United States Patent [19]

Shimazaki et al.

[11] 4,085,258

[45] Apr. 18, 1978

[54] COMBINATION TYPE STANDARD CELL WITH LOW TEMPERATURE COEFFICIENTS

[75] Inventors: Kazumi Shimazaki, Mitaka; Hiroyuki Hirayama, Musashino, both of Japan

[73] Assignee: Agency of Industrial Science & Technology, Tokyo, Japan

[21] Appl. No.: 743,358

[22] Filed: Nov. 19, 1976

[30] Foreign Application Priority Data

Nov. 22, 1975 Japan .................................. 50-139763

[51] Int. Cl.² .............................................. H01M 6/28
[52] U.S. Cl. .................................................. 429/125
[58] Field of Search ................ 429/125, 222, 225–228, 429/218

[56] References Cited

U.S. PATENT DOCUMENTS

| 439,737 | 11/1890 | Weston | 429/125 |
|---|---|---|---|
| 1,865,004 | 6/1932 | Haring | 429/125 X |
| 2,647,155 | 7/1953 | Dyer | 429/125 |

OTHER PUBLICATIONS

Electrochemical Soc., "Amalgam Activities & Standard Electrode Potentials," I. Oin, May 1938, pp. 379–389.

Electrochemical Soc., "Amalgam Activities & Standard Electrode Potentials," II. Leod, May 1939, pp. 167–177.

*Primary Examiner*—Charles F. LeFevour
*Attorney, Agent, or Firm*—Oblon, Fisher, Spivak, McClelland & Maier

[57] ABSTRACT

A combination type standard cell having low temperature coefficients is obtained by combining a plurality of Cd cells, Cd-Pb cells, Cd-Sn cells, Sn-Pb-Cd cells, with the direction of polarity reversed in some of the component cells and a plurality of cells combined in serial connection all in the same direction of polarity.

11 Claims, No Drawings

COMBINATION TYPE STANDARD CELL WITH LOW TEMPERATURE COEFFICIENTS

BACKGROUND OF THE INVENTION

This invention relates to a combination type standard cell having low temperature coefficients.

As the standard cell, there have heretofore been employed saturated type standard cells (neutral cells and acidic cells) containing 10 to 12.5% of Cd amalgam. By a standard cell is meant a cell which produces a given fixed magnitude of electromotive force (voltage) to be used as a standard.

The electromotive force of a given cell varies with the temperature. The electromotive force is expressed by the following formula involving temperature coefficients.

$$E_t = E_{20} + \alpha_{20}(t - 20) + \beta(t - 20)^2 \text{ (For 1 volt)}$$

$$E_t = E_{20}\{1 + \alpha_{20}(t - 20) + \beta(t - 20)^2\} \text{ (For N volts)}$$

wherein, $E_t$ and $E_{20}$ stand for electromotive forces at temperatures of $t°$ C and $20°$ C and $\alpha_{20}$ and $\beta$ for primary and secondary temperature coefficients respectively.

The temperature coefficients of a standard are desirably as low as possible. In most of the standard cells which have to date been put to practical use, the temperature coefficients are on the following orders at best.

$$\alpha_{20} = -40 \, \mu V/k$$

$$\beta = -0.84 \, \mu V/k^2$$

The established practice is to place the standard cell in a bath capable of sensitive temperature control and maintain the electromotive force of this standard cell at a constant level by controlling the temperature of the bath as accurately as possible.

No matter what efforts are made, however, the temperature-control bath cannot be made absolutely free from the effect of slight changes in ambient temperature. In actual practice, therefore, it is impossible to obtain a perfectly constant electromotive force with the conventional standard cell. Need is felt, therefore, for the development of a cell having much smaller temperature coefficients.

An object of this invention is to provide a novel standard cell whose temperature coefficients are decidedly smaller than those of the conventional standard cells.

SUMMARY OF THE INVENTION

To accomplish the object described above, the standard cell according to the present invention has a construction wherein a plurality of standard cells such as, for example, cadmium cells (Cd), cadmium-lead cells (P), cadmium-tin cells (S) and tin-lead-cadmium cells (SP) are combined in a serial connection such that the overall electromotive force has a constant magnitude and the respective temperature coefficients of the component cells offset one another to give rise to very small overall temperature coefficients.

DETAILED DESCRIPTION OF THE INVENTION

The combination type standard cells of the present invention are described below by reference to typical examples thereof.

The combination type standard cells of the present invention are broadly divided into the following two classes (a) and (b).

(a) The class of standard cells having 3, 5, 7 or other odd number of cells combined, with the direction of polarity reversed in some of the component cells, so that the overall electromotive force will equal one volt approximately.

(b) The class of standard cells having a plurality of cells combined in serial connection, all in the same direction of polarity, so that the overall electromotive force will be 2 volts or more.

Representative of the cells to be used for such combinations are those enumerated below.

Cadmium cell (Cd): $\alpha = -39.7 \, \mu V/k$, $\beta = -0.84 \, \mu V/k^2$, Electromotive force = 1.01824 V (at 20° C)

Cadmium-lead cell (P): $\alpha = -17.2 \, \mu V/k$, $\beta = -0.68 \, \mu V/k^2$, Electromotive force = 1.019641 V (at 20° C)

Cadmium-tin cell (S): $\alpha = -15.6 \, \mu V/k$, $\beta = -0.54 \, \mu V/k^2$, Electromotive force = 1.019448 V (at 20° C)

Tin-lead-cadmium cell (SP): $\alpha = +23.5 \, \mu V/k$, $\beta = -0.13 \, \mu V/k^2$, Electromotive force = 1.020840 V (at 20° C)

Now, some of the typical combinations of the classes (a) and (b) described above will be shown below by way of example:

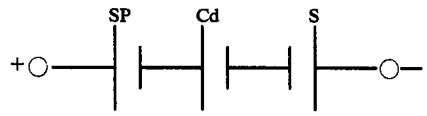

Electromotive force = 1.020016 V (at 20° C)

$\alpha_{20} = -0.63 \, \mu V/k$, $\beta = -0.43 \, \mu V/k^2$

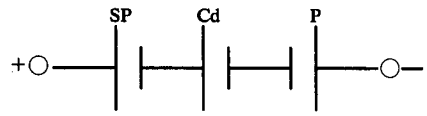

Electromotive force = 1.019823 V (at 20° C)

$\alpha_{20} = +0.96 \, \mu V/k$, $\beta = -0.29 \, \mu V/k^2$

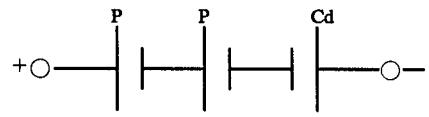

Electromotive force = 1.020670 V (at 25° C)

$\alpha_{25} = +0.11 \, \mu V/k$, $\beta = -0.52 \, \mu V/k^2$

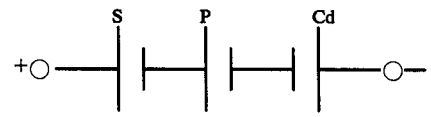

Electromotive force = 1.020495 V (at b 30° C)

$\alpha_{30} = -0.70\ \mu V/k,\quad \beta = -0.38\ \mu V/k^2$

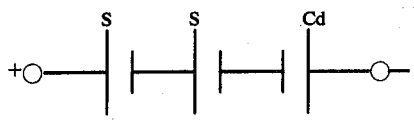

Electromotive force = 1.020344 V (at 35° C)

$\alpha_{35} = +1.29\ \mu V/k,\quad \beta = -0.24\ \mu V/k^2$

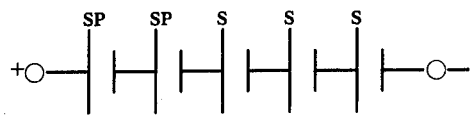

Electromotive force = 5.100022 V (at 20° C)

$\alpha_{20} = +0.03\ ppm/k,\quad \beta = -0.37\ ppm/k^2$

In all the combinations, the absolute value of the primary term $|\alpha|$ is not more than $1 \sim 2\ \mu V/k$ or $1 \sim 2\ ppm/k$ and that of the secondary term $|\beta|$ is not more than $0.6\ \mu V/k^2$ or $0.6\ ppm/k^2$.

Thus, the temperature coefficients of all the combination type standard cells are invariably very small.

These low temperature coefficients are attained by combining a number of individual cells each having its particular temperature coefficients in such manner that the temperature coefficients of the individual cells cancel out to give the combination as a whole temperature coefficients which are exceedingly small.

The examples cited above are typical combination type standard cells of the present invention. By such combinations of component cells, there can be obtained standard cells which have small temperature coefficients and are capable of producing required magnitudes of electromotive force at prescribed temperatures.

As already described, the standard cell is contained in an oil bath or air bath maintained at a prescribed temperature so as to generate a fixed electromotive force. Thus, a combination type standard cells can be formed by selecting a proper combination of component cells of low temperature coefficients proper for the temperature at which they are to be used. As is clear from the foregoing explanation, in the standard cell of the present invention, the temperature coefficients are less than 1/50th of those of the conventional standard cell and the electromotive force generated is affected very little by temperature.

From the practical point of view, the combination type standard cell of the present invention enjoys a great advantage in terms of temperature control over the conventional standard cell, enables the reference voltage to be maintained more accurately than the conventional countertype and permits itself to be used as a transfer standard of unit. Thus, it will greatly contribute to the improvement of the accuracy of voltage standardization.

What is claimed is:

1. A combination-type standard cell comprising three standard cells wherein at least two different types of standard cells selected from the group consisting of Cd standard cells, Cd-Pb standard cells, Cd-Sn standard cells and Sn-Pd-Cd standard cells are combined in serial connection, with two of the three cells in one direction of polarity and the remaining cell in the opposite direction of polarity, so that the overall electromotive force generated is about 1 V and the temperature coefficients of said standard cells offset one another to yield a low overall temperature coefficient.

2. The combination type standard cell of claim 1, wherein a Sn-Pb-Cd cell, a Cd cell and a Cd-Sn cell are connected, with the first two cells in one direction of polarity and the last cell in the opposite direction of polarity.

3. The combination type standard cell of claim 1, wherein a Sn-Pb-Cd cell, a Cd cell and a Cd-Pb cell are connected, with the first wo cells in one direction of polarity and the last cell in the opposite direction of polarity.

4. The combination type standard cell of claim 1, wherein two Cd-Pb cells and one Cd cell are connected, with the first two cells in one direction of polarity and the last cell in the opposite direction of polarity.

5. The combination type standard cell of claim 1, herein a Cd-Sn cell, a Cd-Pb cell and a Cd cell are connected, with the first two cells in one direction of polarity and the last cell in the opposite direction of polarity.

6. The combination type standard cell of claim 1, wherein two Cd-Sn cells and one Cd cell are connected, with the first two cells in one direction of polarity and the last cell in the opposite direction of polarity.

7. A combination-type standard cell comprising two Cd-Pb-Sn standard cells and three Cd-Sn standard cells combined in serial connection in one direction of polarity; such that the overall electromotive force generated is about 5 volts and the temperature coefficients of said Cd-Pb-Sn cells offset the temperature coefficients of said Cd-Sn cells to yield a low overall temperature coefficient.

8. A combination-type standard cell comprising an odd number of standard cells wherein at least two different types of standard cells selected from the group consisting of Cd-standard cells, Cd-Pb standard cells, Cd-Sn standard cells and Cd-Sn-Pb standard cells are combined in serial connection with the direction of the polarity reversed in at least some of the standard cells relative to the other standard cells such that the total electromotive force of said combination-type standard cells will equal about one volt and the temperature coefficients of said standard cells offset one another to yield a low overall temperature coefficient.

9. The cell of claims 8, wherein five standard cells are combined in serial connection.

10. The cell of claim 8, wherein seven standard cells are combined in serial connection.

11. A combination-type standard cell comprising at least two different types of standard cells selected from the group consisting of Cd-standard cells, Cd-Sn standard cells, Cd-Pb standard cells and Cd-Sn-Pb standard cells arranged in serial connection such that the total electromotive force of said combination-type standard cell is at least 2 volts and the temperature coefficients of said standard cells offset one another to yeild a low overall temperature coefficient.

* * * * *